J. H. POPPINK.
MEANS FOR TRANSMITTING ROTARY MOTION.
APPLICATION FILED OCT. 1, 1918.

1,298,560.

Patented Mar. 25, 1919.
2 SHEETS—SHEET 1.

Inventor
J. H. Poppink.
By H. R. Kerslake
Atty.

UNITED STATES PATENT OFFICE.

JAN HENDRIK POPPINK, OF TILBURG, NETHERLANDS, ASSIGNOR OF ONE-HALF TO JOHAN COENRAAD BISCHOFF, OF AMSTERDAM, NETHERLANDS.

MEANS FOR TRANSMITTING ROTARY MOTION.

1,298,560. Specification of Letters Patent. Patented Mar. 25, 1919.

Application filed October 1, 1918. Serial No. 256,431.

*To all whom it may concern:*

Be it known that I, JAN HENDRIK POPPINK, a subject of the Queen of the Netherlands, residing at Tilburg, Netherlands, have invented certain new and useful Improvements in Means for Transmitting Rotary Motion, of which the following is a specification.

My invention relates to new and useful improvements in that type of mechanism for the transmission of rotary motion which comprises a shaft with a ball bearing mounted thereon, wherein either the ball cage, or the ring or track, or the shaft is stationary, so that rotary motion imparted to one of the other members is transmitted to the third member through the medium of the balls.

The primary object of my invention is to construct mechanism of this character wherein the balls are altogether prevented from slipping on their races, another object being to insure a perfectly even wear and tear of the balls. A further object of my invention is to obtain any desired reduction of speed by the use of two rows of balls only and to construct mechanism of the type referred to wherein the reduction of rotary speed may be varied during the operation in a very simple manner.

To these and other ends my invention consists in the mechanism having certain details of construction and combination of parts as will be hereinafter described and more particularly pointed out in the claims.

Figures 1, 2:
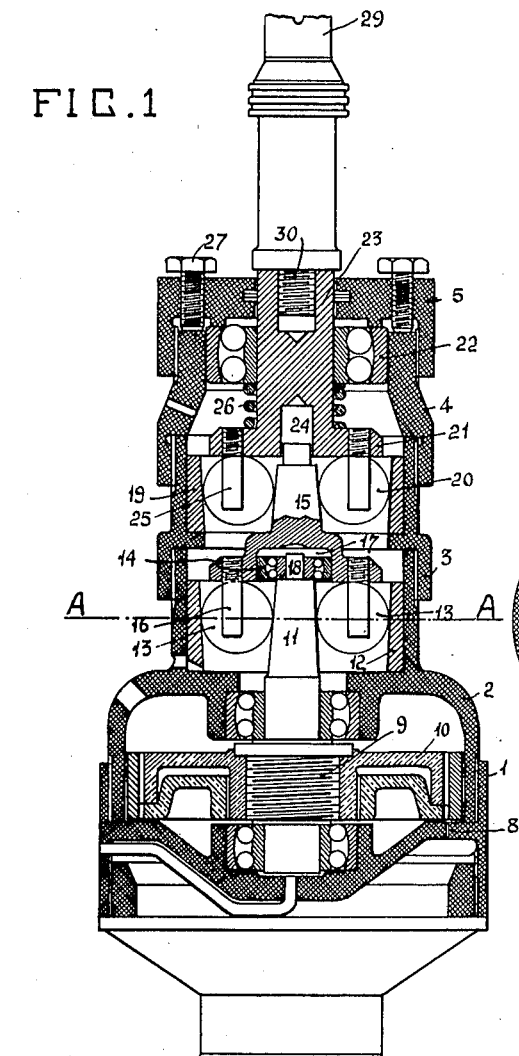
Figure 3:
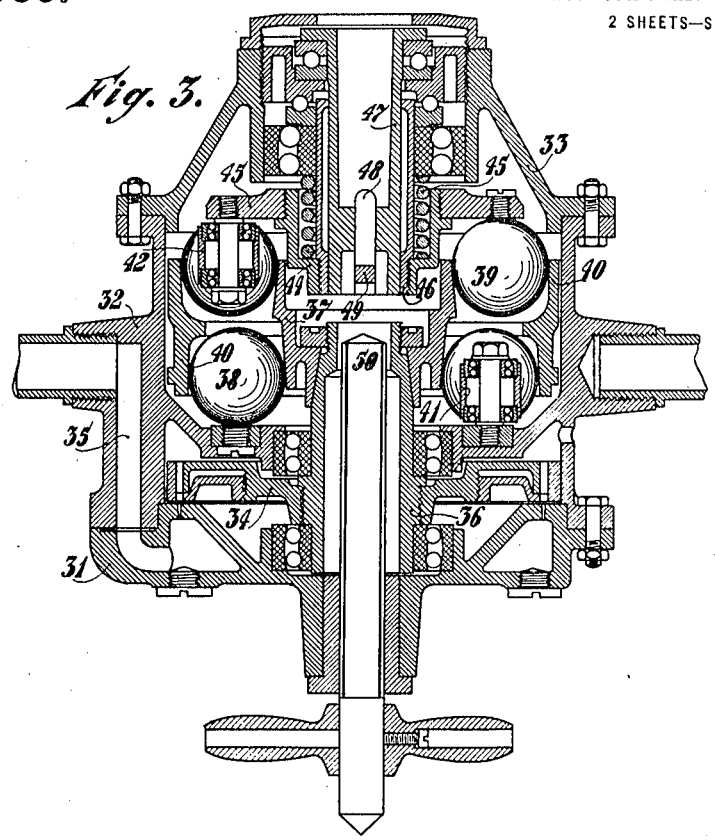
Figure 4:
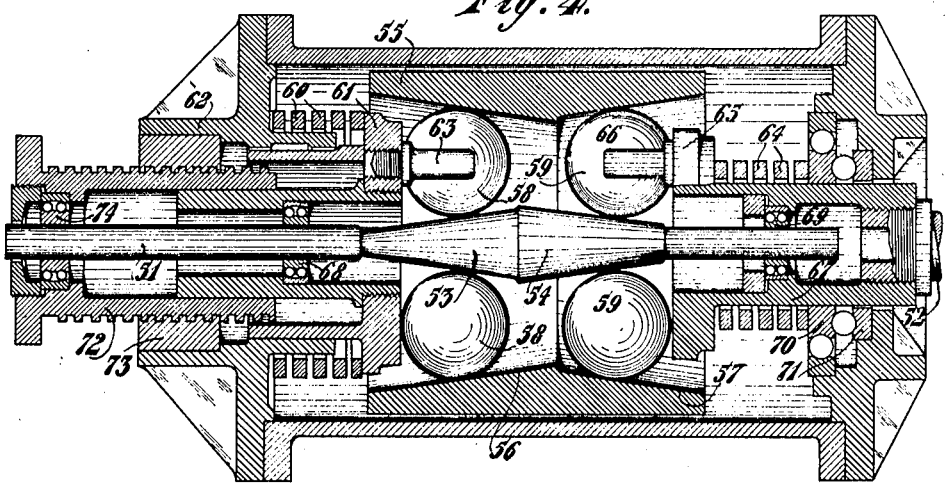

Referring to the drawings, Figure 1 is a sectional elevation of a pneumatic hand drilling machine; Fig. 2 illustrates a cross section along the line A—A of Fig. 1; Fig. 3 is a sectional elevation of a second form of execution of a pneumatic hand drilling machine; and Fig. 4 is a sectional elevation of a change speed gear for motor cars, it being premised, however, that various changes may be made in the details of construction and arrangement by those skilled in the art, without departing from the spirit and scope of my invention.

In Fig. 1 of the drawing, the casing of the apparatus is composed of a plurality of annular sections, 1, 2, 3, 4, 5, screwed together. The section 1 is screwed on the usual handle 7 provided with a valve 6 for the inlet of compressed air flowing through narrow openings 8 in the bottom wall of the ring 1 so as to impinge at a suitable angle upon a turbine disk 10 of convenient construction and secured upon a spindle 9. The spindle 9 is mounted in ball bearings adapted to take up a certain amount of axial pressure as well as the radial load; the said spindle has a hardened and polished beveled journal 11, a beveled and hardened steel track or ring 12 being stationarily mounted within the annular section 2. In the tapering annular space inclosed between the journal 11 and the track or ring 12 are arranged four steel balls 13 pressed against the walls of said space by a disk 14 on the bottom end of a spindle 15. To the said disk 14 are secured four cylindrical hardened studs 16 projecting into the interspace of the balls 13, a recess 17 of said disk serving to receive a ball bearing for a journal 18 of the spindle 9.

The spindle 15 comprises a hardened beveled journal, and a beveled annular ring or track 19 is stationarily mounted within the section 3 of the casing so as to form a second tapering annular space containing four steel balls 20 pressed against the walls of said space by a disk 21 secured to the bottom end of a shaft 23 journaled in a ball bearing 22. The disk 21 is provided with a cylindrical recess 24 for sustaining the spindle 15, and with four cylindrical hardened steel pins 25 secured thereto and projecting into the spaces between the balls 20. Mounted between the inner ring or track of the ball bearing 22, and the disk 21, is a coiled spring 26 having a tendency to yieldingly press the balls 13 and 20 against the walls of the annular spaces between the journals 11 and 15 respectively, and the rings or tracks 12 and 19 respectively. The tension of the coiled spring may be adjusted through the cap 5 by which the ball bearing 22 is held in its proper position and which is locked in the required position by screws 27.

The operation of the described arrangement is as follows:

When rotary motion is imparted to the spindle 11 by the turbine disk 10, the balls 13, which by being firmly pressed on to the beveled surfaces of the spindle 11 and of the ring 12 are forced to roll on said surfaces, receive rotary motion about the spindle 11, so that the spindle 14, 15 is driven by the studs 16. The ratio between the rotary speeds of the spindle 14, 15 and of the turbine shaft 9 is equal to the ratio between the diameters of the journal 11 and of the inner wall of the ring or track 12 at the point of contact with the balls. The rotary speed of the spindle 15 is reduced by the balls 20 in quite a similar manner.

With a device of the character just described the ratio between the rotary speeds of the driving shaft and the driven shaft may be varied in a simple manner by so constructing the mechanism that of the three transmission members (viz., the journal forming the inner track, the row of balls or the ball cage, and the outer track or ring), the one is axially slidable, while one of the two other members, or both, have freedom of automatic adjustment whenever the first member is axially displaced. If the spindle 11 in the transmission gear 11—16 is slidable in the axial direction, it will be readily understood that any displacement of said spindle will cause a change in the ratio between the rotary speeds of driving shaft and driven shaft. For instance, if the said spindle is moved backward, the coiled spring 26 will obviously cause the balls 13 to contact with their inner track at a point where this track has a decreased diameter, whereby the speed of the circular motion imparted to the balls, and consequently to the studs 16 and to the driven shaft, is reduced. If the spindle 11 is moved forward, it is clear that the angular speed of the driven shaft is increased.

The point contact of the parts transmitting the rotary motion (journal, balls, and ring) can only result in pure rolling friction; in the embodiment shown by the drawing sliding friction only results from the contact between the balls 13, 20 and the studs 16 and 25 respectively, but owing to the point contact this sliding friction is a minimum. Besides, the balls do not always rotate on the same axis; consequently the point of contact between these balls at the one side, and the driving studs, the spindle, and the outer ball race on the other side, is gradually displaced so that the balls exactly retain their spherical shape. This displacement of the point of contact on the balls may still be accelerated by beveling the outer ball race to a slightly different angle than the journal or inner race.

In the embodiment shown by the drawing the shaft 23 is secured to the drill rod 29 so that the axial pressure exerted by the work upon the said rod is transmitted upon the balls 13, 20; said balls may of course be relieved from this pressure by connecting the rod 29 with the shaft 23 in a manner which permits of axial sliding movement of these parts relative to one another, and by providing a collar or a ball bearing having for its duty to transmit the axial pressure of said rod directly upon the casing.

If the spindle 15 in the apparatus shown by the drawing extends through the entire length of the shaft 23, the construction may be such that the rod 29 with a chuck to hold a drill (not shown) may be coupled either with the shaft 23 or with the spindle 15; if now the drill rod 29 is coupled with the extended spindle 15 the drill will be turned at a higher speed than when it is coupled with the shaft 23, so that the apparatus may be used for drilling holes in wood as well as in metal.

It is obvious that the new principle of transmission of rotary motion may be embodied in other structures than the one shown in the drawing. For instance, the ball races 11 and 15, and 12 and 19 need not be exactly cone-shaped; it is only required that the space left between these parts has a tapering form in order that the balls 13 and 20 respectively may always be pressed with sufficient force against the walls of this space. Further, the studs 16 and 25 repectively may be rotatably mounted in bushes in the disks 14 and 21 respectively; with this arrangement the sliding friction between said studs and the balls 13 and 20 respectively is substituted by rolling friction.

Obviously the arrangement may also be such that the beveled ring surrounding the driving shaft is not stationary, but rotatable about said shaft; in this case the driving balls must be prevented from following the rotary movement about the axis of said shaft. It will be readily understood that the rotation of the shaft will now cause the ring or track to revolve in the reverse direction and at a reduced speed, the ratio between the rotary speeds being dependent upon the dimensions of the members transmitting said motion. The ring, which may be formed as a pulley or as a gear wheel, may as a matter of course also be used as a driving part, when the shaft will be driven at an increased speed.

In order that rotary speed may be reduced to any considerable extent it is obviously required with mechanism of the type just described to effect the reduction in several stages, which may necessitate the employment of a comparatively great number of ball rows. Now, the mechanism illustrated in Fig. 3 allows of obtaining any reduction of rotary speed with two rows of balls only as will be described hereinafter.

In Fig. 3, the numerals 31, 32, 33 designate the parts constituting the casing of the drilling machine. Mounted on a hollow shaft 36 and located in said casing is a turbine disk 34 adapted to be driven by compressed air supplied by the pipe 35. On the end of the shaft 36 is secured a biconical member 37 serving as the inner race for two rows of balls 38 and 39, the outer race of which is formed by a loose ring or track 40 with double cone-shaped inner walls. Projecting into the interspaces of the balls 38 are rollers 41 rotatably mounted on fixed pins through the medium of ball bearings.

The circular motion of the balls 39 about the axis of the apparatus is transmitted to rollers 42 mounted through ball bearings on pins provided on a pressure disk 43, the said disk being connected, through an intermediate member 44 loaded by a helical spring 45, with a hollow shaft 46 for receiving the drill holder 47.

The hollow shaft 46 and the drill holder 47 have freedom of relative axial movement owing to the holder 47 being provided with a slot 48 into which extends a cross-pin 49 of the shaft 46. A screw-threaded shaft 50 serves the purpose of moving the drill forward during the operation.

If compressed air is admitted by the pipe 35, the turbine disk will be driven at a high angular speed. The biconical member 37, rotating at the same angular speed, will impart rotary motion in opposite direction to the ring 40 through the balls 38 mounted in a fixed cage. At the point of contact with the balls 38 the ring 40 and the member 37 have the same circumferential speed, but owing to the difference between their diameters the angular speed of the ring 40 will be lower than that of the member 37.

The balls 39 receive from the member 37 at their inside, and from the ring 40 at their outside, but in opposite direction, a higher circumferential speed than the balls 38. If now the balls 38 and 39 have the same size, as is the case in the example illustrated in the drawing, the difference between the circumferential speeds of the balls 38 and 39 is greater at the inside than at the outside, and it will be readily seen that under these circumstances the balls 39 will move along a circular path about the axis of the apparatus at a lower speed than the turbine disk 34, but in opposite direction, and that by suitably dimensioning the different parts the reduction of the speed of said disk may be increased arbitrarily. As a matter of course, the gear should be so constructed that the balls are prevented from slipping on their races.

Also in this apparatus the reduction of the speed may be changed during the operating by axially displacing either the inner race, or the balls, or the outer race, by which the further advantageous feature is obtained that by suitably dimensioning the different parts the driven shaft may be turned either in the same direction as the driving shaft, or in the opposite direction, or be entirely stopped, while the driving shaft is uninterruptedly turning at constant speed in the same direction.

Fig. 4 shows, by way of example, a mechanism with which this change in rotary speed and direction of motion may be realized in a simple manner.

In this figure, the numeral 51 designates a driving shaft in alinement with a driven shaft 52, and provided at one end with conical faces 53, 54 pointing in opposite directions. Around this part of the driving shaft 51 is mounted a loose ring 55, the inner face of which has two conical surfaces 56, 57. In the tapering spaces thus formed by the said conical surfaces are located two rows of balls 58 and 59.

The balls 58 are pressed into the one tapering space by a strong helical spring 60 through the medium of a pressure disk 61. Said disk 61 has no freedom of rotary motion, but it is axially slidable in the casing 62 and provided with studs 63 extending into the interspaces of the balls 58 which, therefore, are only free to rotate about their own axes.

The balls 59 are pressed into the second tapering space by a strong helical spring 64 through the medium of a pressure disk 65; owing to the ring 55 being freely mounted in the casing 62, the springs 60 and 64 will obviously equilibrate one another. The pressure disk 65 is rotatable and provided with studs 66 extending into the interspaces of the balls 59, so that the circular motion of the balls 59 about the axis of the apparatus will be transmitted to the driven shaft 52 through the pressure disk 65 and an intermediate member 67.

The driving shaft 51 is axially slidable in ball bearings 68, 69, whereas the driven shaft 52 is adjustably supported in a ball bearing 70; the inner ball race of said bearing 70 bears against a thrust bearing provided in the casing 62, so that it can take up the thrust of the spring 64.

The driving shaft is adapted to be axially displaced by means of a sleeve 72 screwed into a fixed nut, the said sleeve, when being moved axially, transmittting its motion to said shaft through a ball bearing 74 arranged to take up both axial and radial pressure and shrunk with its inner race on the shaft 51.

The operation of the device just described is as follows:

If the driving shaft 51 assumes the position shown in Fig. 4, the balls 58 and 59 contact with the inner and the outer conical surfaces in points where the said races have equal diameters. Owing to rotary motion imparted to the shaft 51 the ring 55 is turned by the balls 58 in the opposite direction at a reduced angular speed. It will be readily seen that the balls 59 between the ring 55 and the second conical race of the shaft 51 are in quite the same condition as the balls 58, so that the latter also receive rotary motion about their own axes without moving along a circular path about the axis of the apparatus, and the studs 66, as also the shaft 52, remain stationary.

If, now, the driving shaft 51 is moved to the right, the ring 55, owing to the increased pressure of the spring 64, will move to the left until the springs 60 and 64 again equilibrate one another. Under these circumstances the balls 59 roll along a circle having a smaller diameter than that on which they ran originally, so that they cause the ring 55 to turn at a reduced angular speed. The balls 59, however, roll along a circle having a greater diameter than that on which they ran originally, and they receive from the driving shaft a higher circumferential speed than before. That is to say, while the angular speed of the ring 55 has decreased, the increased effect of the driving shaft 51, in connection with the decreased effect of the ring 55, causes the balls 59 to move along a circular path about the axis of the apparatus in the same direction as the shaft 51. This motion of the balls 59 is transmitted to the shaft 52 through the studs 66, the disk 65 and the intermediate piece 67, and the angular speed of this motion increases according as the shaft 51 is moved farther to the right.

On the other hand, if the driving shaft 51 from its center position is moved to the left, the ring 55, under the influence of the spring 60, will move to the right; the angular speed of this ring will increase, whereas the effect of the driving shaft on the balls 59 is reduced owing to the decrease in the diameter of the circle along which these balls are rolling. Consequently, the balls 59 are caused to follow the motion of the ring 55, that is to say, they will move along a circular path about the axis of the apparatus in a direction opposite to that of the shaft 51; it is obvious that the shaft 52, under these circumstances, also turns in a direction opposite to that of said shaft 51 at an angular speed which increases according as the shaft 51 is moved farther to the left.

If the mechanism illustrated in Fig. 4 is used to substitute the usual change speed gear of motor cars, the car will move forward whenever the shafts 51 and 52 turn in the same direction, and backward when these shafts turn in opposite directions. The mechanism, in this case, should be so constructed that the shaft 51 from its central position is adapted to move through a greater distance to the right than to the left, as the ratio between the speeds of said shaft should be variable within wider limits for the forward movement than for the backward movement.

The mechanism illustrated in Figs. 3 and 4 may be employed for different purposes. The ring 55 may, if so desired, be used as a pulley to drive the shaft 52, when the shaft 51, although turning in a given direction, has not to transmit any power and only serves for changing the ratio between the speeds of the ring 55 and the shaft 52. For driving machine tools, for instance, this mechanism may be advantageously employed.

What I claim as new, and desire to secure by Letters Patent, is:

1. In mechanism for the transmission of rotary motion of the type referred to, the combination of a casing, a shaft rotatably mounted therein, a ring or track around said shaft, said shaft and ring having a tapering annular space formed therebetween, balls in contact with the inner and the outer walls of said space, a second shaft in alinement with the first shaft, means for coupling the balls with the second shaft so as to insure them freedom of rolling motion on said walls in a circular path around the shaft, means for axially moving the balls relative to their races, and automatic means for permanently insuring the required contact between the balls and their races.

2. In mechanism for the transmission of rotary motion of the type referred to, the combination of a casing, a shaft rotatably mounted therein, a biconical member coaxially secured to said shaft, a biconical ring freely mounted coaxially around said member, said shaft and ring having annular spaces tapering in opposite directions therebetween, two rows of balls in contact with the inner and outer walls of said spaces, means for preventing one row of balls from rotating around the shaft but insuring them freedom of rotary motion about their own axes, a second shaft in alinement with the first shaft, and means for coupling the balls of the second row of balls with the second shaft so as to insure them freedom of rolling motion on said walls in a circular path around the shafts.

3. In mechanism for the transmission of rotary motion of the type referred to, the combination of a casing, a shaft slidably mounted in said casing, a biconical member coaxially secured to said shaft, a biconical ring freely mounted coaxially around said member, said shaft and ring having annular spaces tapering in opposite directions formed therebetween, two rows of balls in contact with the inner and outer walls of said spaces, means for preventing one row of balls from rotating around the shaft but insuring them freedom of rotary motion about their own axes, a second shaft in alinement with the first shaft, means for coupling the balls of the second row of balls with the second shaft so as to insure them freedom of rolling motion on said walls in a circular path around the shafts, and springs tending to press the two rows of balls toward one another into the said tapering spaces.

In testimony whereof I affix my signature.

JAN HENDRIK POPPINK.